United States Patent [19]

Hartkorn

[11] 4,121,508

[45] Oct. 24, 1978

[54] AUTOMATIC COFFEE PERCOLATOR

[75] Inventor: Hans Walter Hartkorn, Munich, Germany

[73] Assignee: Ritterwerk GmbH, Munich, Germany

[21] Appl. No.: 798,103

[22] Filed: May 18, 1977

[30] Foreign Application Priority Data

May 18, 1976 [DE] Fed. Rep. of Germany ....... 2622067

[51] Int. Cl.² .............................................. A47J 31/00
[52] U.S. Cl. ...................................... 99/283; 99/306; 219/281
[58] Field of Search ................. 99/283, 281, 300, 304, 99/305, 307; 219/281, 301, 505, 311; 417/207

[56] References Cited

U.S. PATENT DOCUMENTS

| 2,725,008 | 11/1955 | Okie | 99/283 |
| 2,818,010 | 12/1957 | Okie | 99/283 |
| 2,926,234 | 2/1960 | Palmer | 99/305 |
| 3,442,199 | 5/1969 | Grail | 99/283 |
| 3,691,934 | 9/1972 | Horn | 99/307 |
| 4,000,396 | 12/1976 | Abel | 219/306 |

*Primary Examiner*—Robert W. Jenkins
*Attorney, Agent, or Firm*—Staas & Halsey

[57] ABSTRACT

An automatic coffee percolator with a fresh-water reservoir, a continuous-flow heater below the fresh-water reservoir, the heater including at its end a completely closing valve under control of a temperature sensor, and also comprising a percolator element with a filter, which is arranged below the continuous-flow heater, a receptacle being arranged underneath the percolator element. In such automatic coffee percolator hot water or vapor is not discharged into the fresh-water reservoir, and the water flowing through the continuous flow heater can be controlled within a narrow temperature range independently of the pressure of the supplied water.

18 Claims, 4 Drawing Figures

AUTOMATIC COFFEE PERCOLATOR

BACKGROUND AND SUMMARY OF INVENTION

The present invention relates to an automatic coffee percolator comprising a fresh-water reservoir, a continuous-flow heater below said fresh-water reservoir, which heater includes, at the end thereof, a completely closing valve under control of a temperature sensor, and furthermore comprising a percolator element with a filter, underneath said continuous-flow heater, and a receptacle below said percolator element.

Such automatic coffee percolators, wherein the heated water is directed to the filter element by gravity action, have been disclosed, inter alia, by the German utility model No. 75 00 498. In such known automatic coffee percolators percolator the vapor bubbles produced when the water starts to boil in the continuous-flow heater urge water back into the fresh-water reservoir. Only when an externally mounted electric temperature control element has responded and when the water has cooled down, can additional fresh water be charged into the continuous-flow heater. Such vapor is produced especially in the final phase of the water heating process in the continuous-flow heater, which can entail undesired noise.

In contrast with such an automatic coffee percolator, the present invention is directed to an automatic coffee percolator with a particularly simply designed continuous-flow heater which operates very reliably and by which the discharge of hot water or vapor into the fresh-water reservoir is safely avoided; in such an automatic coffee percolator the water flowing through the continuous-flow heater can be stepwise controlled within a narrow temperature range, independently of the pressure of the supplied water.

According to the present invention this object is achieved because said valve at the discharge side of the continuous-flow heater is a pressureless and thermally operating valve which opens in the water discharge direction, and a second valve is provided, at the entry side of said continuous-flow heater. This second valve is of the check type and is open when said fresh-water reservoir contains water.

In such a structure of the continuous-flow heater, the discharge of hot water and vapor into the fresh-water reservoir is safely avoided at temperatures above the boiling point because the check valve at the entry side of the continuous-flow heater closes. In the continuous-flow heater itself, moreover, excessive pressure cannot be produced since the valve which opens in the water discharge direction at the discharge side operates as a safety valve independently of its thermally controlled actuation.

In spite of the provision of an additional valve at the entry side of the continuous-flow heater, the automatic coffee percolator can begin full operation immediately after the fresh-water reservoir is filed because the water can flow toward the continuous-flow heater without being affected by the valve at the entry side and because the valve at the discharge side discharges the water immediately after heating it to its nominal temperature.

It is expedient to design the valve at the discharge side as a ball type valve with a valve stem projecting into the flow channel of the continuous-flow heater. This ensures particularly safe operation and a sturdy construction of the valve at the discharge side of the continuous-flow heater.

To adjust of the control range, it is desirable that the valve seat of the valve at the discharge side of the continuous-flow heater be adjustable. Adjustment of the valve seat in the vertical direction entails a shift of the opening temperature of the valve.

The temperature sensor is preferably a bimetal strip connected to a supporting projection of the valve at the discharge side, with one arm of this strip being connected to the casing of the continuous-flow heater while the other arm is adapted to be freely movable but loosely connected to the supporting projection of the valve. If the first arm of the bimetal strip is permanently attached to the top of the casing of the continuous-flow heater the bimetal strip must be designed in a way that the freely movable arm moves away from the permanently attached arm when temperature rises. If however, the first arm of the bimetal strip is permanently attached to the bottom of the casing, the bimetal strip must be constructed so that the freely movable arm moves toward the permanently attached arm when temperature rises. In the latter case the first arm of the bimetal strip is preferably connected to the heating element at the bottom of the continuous-flow heater.

For a further simplification of the continuous-flow heater structure it is desirable that the valve at the entry side of the continuous-flow heater be a ball valve. It can also be advantageous if the casing of the valve at the entry side of the continuous-flow heater is integral with the fresh-water reservoir.

Finally, it is desirable that the two valves of the continuous-flow heater be so designed that the cross-sectional area of the flow passage of the valve at the discharge side is greater than the cross-sectional area of the valve at the entry side of the continuous-flow heater.

The larger cross-sectional area of the flow passage at the discharge side provides for the quickest possible discharge of the heated water during the start-up period, when all of the water in the continuous-flow heater reaches the proper temperature at the same time. The cross-sectional area of the flow passage at the entry side of the continuous-flow heater, however, is kept small enough that entering cold water, by the time it reaches the discharge side, has reached nominal temperature, if possible, so that changing the position of the valve at the discharge side becomes unnecessary. Such structure of the continuous-flow heater results in control of the PD or proportional plus derivative type.

BRIEF DESCRIPTION OF THE DRAWINGS

The drawings show one embodiment of the invention which will be specified in detail in the following. In the drawings.

DESCRIPTION OF THE PREFERRED EMBODIMENT

Figure 1:
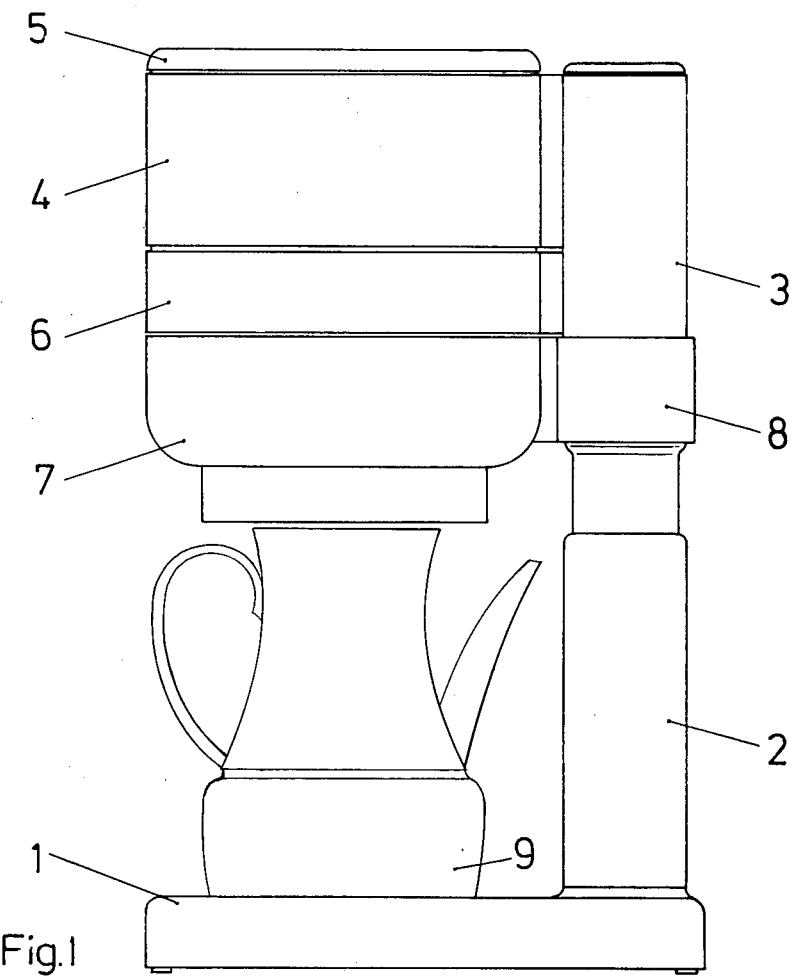
FIG. 1 is a lateral view of an automatic coffee percolator.

The automatic coffee-percolator as illustrated in FIG. 1 has a base 1 to which a vertical tube is attached. The vertical tube has a telescopic structure and comprises a stationary vertical tube section 2, which is attached to the base, and a vertical tube section 3 adapted for telescopic displacement relative to the vertical tube section 2. At the top of the displaceable vertical tube section 3, a fresh-water reservoir 4 is provided which is covered by a lid or cover 5. Immediately below the fresh-water reservoir 4 a continuous-flow heater 6 is provided.

The unit comprising the fresh-water reservoir 4 and the continuous-flow heater 6 is on top of a percolator element 7 which is attached at the displaceable vertical tube section 3 for swing-out movement. Hence, the percolator element 7 can be laterally swung out of its position below the fresh-water reservoir 4, e.g. for charging with ground coffee. A filter, which is not represented in detail, preferably a gold filter, is provided at the lower end of the percolator element 7. Moreover, a plate-warmer is provided at the base 1, onto which a pot can be placed as the receptacle 9 for prepared coffee so that the coffee flows from the percolator element 7 directly into the receptacle 9. By adjusting of the displaceable vertical tube section 4 relative to the stationary vertical tube section 2, it is possible to accommodate pots of varying heights.

Figure 2:
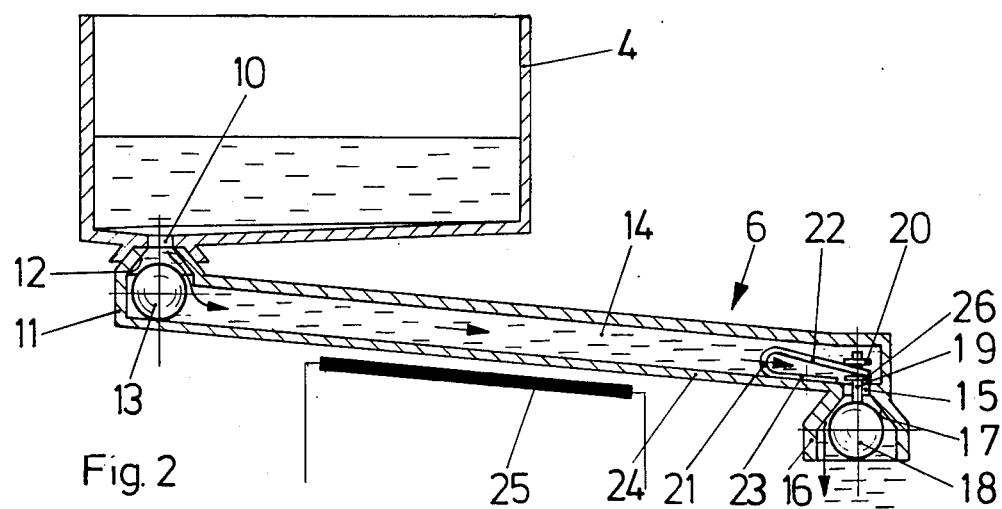
FIG. 2 is a schematic of the continuous-flow heater for the automatic coffee percolator (in cross-sectional view)

FIG. 2 shows more details of the continuous-flow heater 6. At the entry side of the continuous-flow heater 6 an opening 10 is provided through which water can enter from the fresh-water reservoir 4 into the continuous-flow heater 6. Immediately below this opening 10 a valve 11 of the check type is provided, which comprises a valve seat 12 and a spherical valve body 13. When vapor bubbles are in the flow passage 14 of the continuous flow heater 6 the spherical valve body 13 is lifted so that the valve 11 is closed.

At the discharge side of the continuous-flow heater 6 an opening 15 is provided through which the heated water is discharged. Below this opening 15, a thermally controlled valve 16 is arranged. The valve 16 comprises a valve seat 17 and a spherical valve body 18 with a valve stem 19 projecting through the opening 15 into the flow passage 14. At the top of the valve stem 19 a supporting projection or lug 20 is provided to which the free arm 22 of a bimetal strip 21 is attached. The second arm 23 of the bimetal strip 21 is permanently attached to the casing 24 of the continuous-flow heater 6 at the bottom side thereof, where the heating element 25 of the continuous-flow heater is also located.

The free arm 22 of the bimetal strip 21 urges the spherical valve body 18 of the valve 16 upwardly when the water in the continuous-flow heater 6 is cold. When the water in the flow passage 14 has reached the proper temperature the free arm 22 of the bimetal strip 21 moves in downward direction so that the valve body 18 is lifted off the valve seat and the heated water can flow out through the opening 15. If an excessive excess pressure develops in the flow passage 14, the valve 16 is opened in any case since the pressure forces body 18 downward.

Between the supporting projection 20 and the valve body 18, at the valve stem 19, another projection 26 is provided. The free arm 22 of the bimetal strip 21 is engaged, like a fork, between the supporting projection 20 and the additional projection 26. Free arm 22 presses onto the projection 26 during the opening movement, moving valve body 18 and opening open valve 16.

Figure 3:
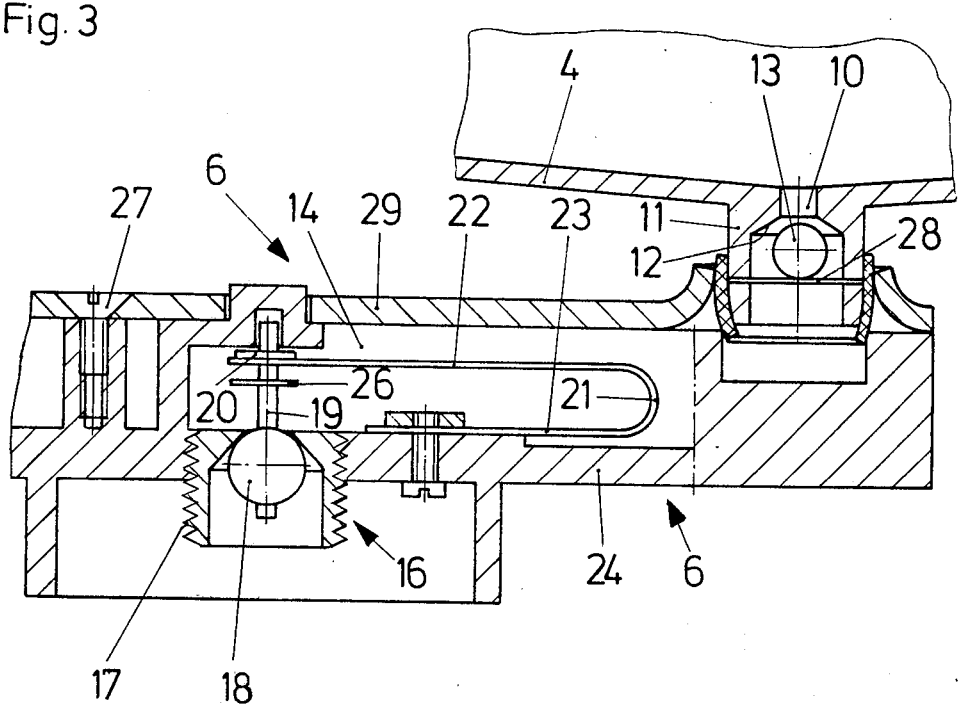
FIG. 3 is a partial view of one embodiment of a continuous-flow heater for the automatic coffee percolator.

FIG. 3 illustrates a schematic longitudinal view of a practical embodiment of the continuous-flow heater 6. The section is taken in a way that it goes through both the valve 11 at the entry side and the valve 16 at the discharge side.

FIG. 3 shows that the casing 24 of the continuous-flow heater 6 is closed by a cover 29 which can be removed from the casing 24 when a screw 27 has been unscrewed. The spherical valve body 13 of the valve 11 at the entry side of the continuous-flow heater 6 is restricted by a support 28 with respect to its movement away from the valve seat 12.

As can also be noted from FIG. 3, valve 11 or its valve seat 12 is integral with the fresh-water reservoir 4 in the discharge portion thereof.

The valve seat 17 of valve 16 at the discharge side of the continuous-flow heater 6 is adapted to be vertically adjusted. For adjustment of the opening temperature of the valve 16, the valve seat 17 is adjusted so that the bimetal strip 21 or its free arm 22, respectively, are differently biased. When the bimetal strip 21, which is arranged in the water of the flow channel 14, is heated the bias is gradually reduced and the free arm 22 of the bimetal strip 21 finally moves toward the spherical valve body 18 when the temperature rises. Thereby, the free arm 22 presses onto the projection 26 at the valve stem 19 so that the valve body 18 is removed from its valve seat 17 and thus permits free passage of water.

The time which is required to heat the water in the flow channel 14 depends on the supply temperature of the water and on the electrical voltage or heating power. To keep the temperature of the water discharge from the continuous-flow heater constant within the provided control range, the cross-sectional area of the discharge passage of the valve 16 varies in operation as a function of the deflection of the free arm 22 of the bimetal strip 21. When the valve 16 is fully open the cross-sectional area of the discharge passage is so great that the heated water is discharged as quickly as possible. In the start-up period of operation of the continuous-flow heater, this is important because all of the water in the continuous flow heater reaches the proper temperature at the same time and should be discharged as quickly as possible.

When the water-heating process is continued the water should enter the flow passage 14, if possible in quantities such that the water has just reached the proper temperature when it reaches the opening 15. For this reason the cross-sectional area of the passage of valve 11 at the entry side of the continuous-flow heater is smaller than the corresponding area at valve 16 at the discharge side and is selected to be dimensioned so that in normal operation just that amount of water enters the flow channel 14 which can be kept at the proper temperature at the opening 15 in the discharge section. In such a case the valve 16 at the discharge side need not become active to achieve a throttling effect.

When flow channel 14 contains water with a temperature above 100° C., which is the case especially in the final phase of the percolating process, vapor forces valve 11 at the entry side closed so that discharge of hot water and vapor into the fresh-water reservoir 4 is avoided. Excessive pressure in flow channel 14 causes the valve 16 to open regardless of the state of bimetal strip 21, so that this valve is employed as a safety valve when valve 11 is closed.

Figure 4:
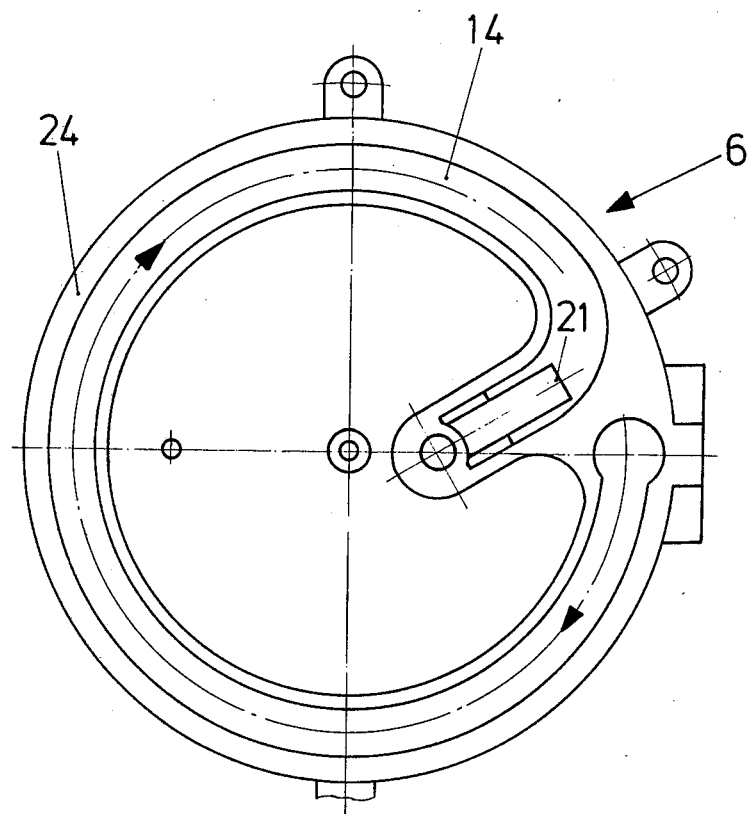
FIG. 4 is a top view of the continuous-flow heater as shown in FIG. 3 in a slightly reduced scale, while the cover, the fresh-water reservoir and the check valve are removed.

FIG. 4 shows a top view of the continuous-flow heater according to FIG. 3 while the cover 29 and the fresh-water reservoir 4 and valve 11 are removed. The water moves in the flow passage 14 in the direction of the illustrated arrows.

I claim:

1. An automatic coffee-percolator of the type having a freshwater reservoir; a continuous-flow heater below said freshwater reservoir, said heater having an entry side and a discharge side; a completely closing valve under control of a temperature sensor mounted at the discharge side of said continuous-flow heater; a percolator element with a filter underneath said continuous-flow heater; and a receptacle below said percolator element, wherein the improvement comprises: said valve at the discharge side of said continuous-flow heater is a pressure-responsive and thermally operating valve which opens in the water discharge direction; and further comprising a valve mounted at the entry side of said continuous-flow heater, said valve being of the check type and being open when said fresh-water reservoir contains water.

2. An automatic coffee-percolator as claimed in claim 1, wherein said valve at the discharge side is of the ball type and comprises a valve stem projecting into the flow channel of said continuous-flow heater.

3. An automatic coffee-percolator as claimed in claim 1, wherein the valve seat of said valve at the discharge side of said continuous-flow heater is adapted to be adjusted.

4. An automatic coffee-percolator as claimed in claim 1, wherein said temperature sensor is a bimetal strip connected to a supporting projection of the said valve at the discharge side of said continuous-flow heater.

5. An automatic coffee-percolator as claimed in claim 4, wherein said continuous-flow heater has a casing and one arm of said bimetal strip is permanently attached to the casing of said continuour-flow heater while the other arm of said bimetal strip is adapted to be freely movable and is connected with said supporting projection of said valve at the discharge side.

6. An automatic coffee-percolator as claimed in claim 5, wherein said first arm of said bimetal strip is connected to the heating element at the bottom of the said continuous-flow heater.

7. An automatic coffee-percolator as claimed in claim 1, wherein said valve at the entry side of the said continuous-flow heater is of the ball-check type.

8. An automatic coffee-percolator as claimed in claim 1, wherein said casing of said valve at the entry side of the said continuous-flow heater is integral with said fresh-water reservoir.

9. An automatic coffee-percolator as claimed in claim 1, wherein the cross-sectional area of the flow-passage of the said valve at the discharge side exceeds the cross-sectional area of the flow passage of the said valve at the entry side of the said continuous-flow heater.

10. An automatic coffee maker comprising:
a water reservoir;
a continuous-flow heater for heating water to a selected temperature mounted below said reservoir, said heater having a water entry end and a water discharge end;
a first valve mounted at the water entry end of said continuous-flow heater;
first means for closing said first valve when water vapor bubbles are in said continuous-flow heater;
a second valve mounted at the water discharge end of said continuous-flow heater; and
second means for opening said second valve when the water at said discharge end of said continuous-flow heater has reached the selected temperature, said second means additionally opening said second valve in response to excessive pressure in said continuous-flow heater.

11. The automatic coffee maker of claim 10, wherein said second valve comprises a ball type valve having a valve stem which projects into said continuous-flow heater.

12. The automatic coffee maker of claim 11, wherein said continuous-flow heater has an adjustable valve seat at said water discharge end.

13. The automatic coffee maker of claim 11, wherein said second means comprises a bimetalic strip.

14. The automatic coffee maker of claim 13, wherein said bimetalic strip has fixed and movable ends, said fixed end being fixed to the interior of said continuous-flow heater and said movable end being movably attached to said valve stem.

15. The automatic coffee maker of claim 14, wherein said continuous-flow heater has a heating element mounted at the bottom thereof and said fixed end of said bimetalic strip is fixed to said heating element.

16. The automatic coffee maker of claim 14, wherein said first valve is a ball-check valve.

17. The automatic coffee maker of claim 16, wherein the casing of said first valve is intergal with said water reservoir.

18. The automatic coffee maker of claim 14, wherein the cross-sectional area of said continuous-flow heater is larger at said water discharge end than at said water entry end.

* * * * *

UNITED STATES PATENT OFFICE
CERTIFICATE OF CORRECTION

Patent No. 4121508      Dated October 24, 1978

Inventor(s) Hans Walter Hartkorn

It is certified that error appears in the above-identified patent and that said Letters Patent are hereby corrected as shown below:

Col. 1, line 18, delete "percolator"

\* Col. 1, line 60, change "filed" to --filled-

\* Col. 5, line 10, change "freshwater" to --fresh-water--

\* Col. 6, line 11, change "freshwater" to --fresh-water--

Signed and Sealed this

Sixth Day of March 1979

[SEAL]

Attest:

RUTH C. MASON
Attesting Officer

DONALD W. BANNER
Commissioner of Patents and Trademarks